Patented Aug. 25, 1936

2,052,172

UNITED STATES PATENT OFFICE 2,052,172

TREATING AND IMPREGNATION OF WOOD

Per K. Frolich, Elizabeth, N. J., assignor to Standard Oil Development Company, a corporation of Delaware No Drawing. Application February 11, 1932, Serial No. 592,445

5 Claims. (Cl. 91—68)

This invention relates to an improved method for the treating and impregnation of wood, fiber board and similar fibrous and porous materials with resins obtained from hydrocarbon oils. This invention relates more particularly to the use of resins derived from tarry decomposition products obtained on subjecting petroleum oils to decomposition temperatures at elevated pressures.

In the thermal decomposition or cracking of hydrocarbon oils there is usually produced as a residual by-product a dark viscous mass known as cracking coil tar. This tar contains resins which may be extracted by suitable means. It also contains heavy difficultly volatile oils which may be used for the production of improved resins. The tar also contains asphaltenes which may be converted into resins by hydrogenation. The resins obtained by these and other similar methods may be suitably called synthetic petroleum resins, as they are produced from petroleum oils which, before treatment, contain substantially no resins.

It has now been found that the synthetic petroleum resins obtained from cracking coil tars are especially suitable for use in the treating and impregnation of wood and similar materials. These resins are completely soluble in ordinary hydrocarbon solvents used for wood impregnation and may be used in volatile solvents such as light gasolines or in heavy substantially non-volatile hydrocarbon oils such as those customarily used for the impregnation of wood with high melting waxes. These resins are substantially free from asphaltic matter or asphaltenes and therefore possess none of the undesirable qualities imparted to ordinary petroleum residues by these substances.

These resins in proper concentration may be used to stain wood a rich color similar to mahogany or oak, the shade depending upon the particular type and concentration of resin and type of wood treated. These resins usually render the surface of wood less slippery and glossy than do ordinary dyes, varnish stains and the like. Wood impregnated at elevated pressure with a solution of these resins contains the resins distributed throughout it so that the impregnated wood may be subsequently cut or planed into any desired shapes without change in the color or finish of the product. Such products are especially suitable for flooring and similar uses where they are subjected to considerable wear since it is impossible to remove the color by abrasion of the surface of the wood. These resins are remarkably stable, are substantially unsaponifiable and hence are resistant to the action of saponifying agents which may be used in preparations for cleaning floors and the like.

A method of preparing resins by a selective solvent extraction of the residue formed by cracking a non-resin-containing oil after removal of oily components of the residue is described in the co-pending application Ser. No. 572,059 filed October 30, 1931, by Stewart C. Fulton. This method is illustrated by the following example:

*Example 1*

1000 gallons of cracking coil tar, gravity 10° A. P. I. was distilled under vacuum to a still temperature of 660° F. leaving 1334 pounds of bottoms, softening point 225° F. (ball and ring method). The bottoms were taken up in 508 gallons of kerosene distillate or "Varsol" in two hot extractions with agitation (391 gallons for first extraction and 127 gallons for extracting the residue). In this way 1000 pounds of the bottoms were found to be soluble in the "Varsol" leaving 334 pounds of insoluble asphaltenes. 200 pounds of 66° Bé. sulfuric acid was added to the "Varsol" solution with agitation, the agitation being continued for 15 minutes. After settling, the granular sludge was removed by decantation and filtration, and the "Varsol" solution agitated with 80 pounds of Attapulgus fines for 15 minutes. The "Varsol" solution was then filtered to remove the clay and distilled to separate the "Varsol" from the resin yielding 584 pounds of resin, softening point 193° F. (ball and ring method).

A process for preparing a resin from a vacuum distillate, obtained from cracked tar by treating the tar distillate fractions with chlorine, subsequently removing the chlorine and oily constituents by distillation, and extracting the resin from the distillation residue with a selective solvent, is described in co-pending application Ser. No. 572,058, filed October 30, 1931, by Stewart C. Fulton. This process is illustrated by the following example:

*Example 2*

1000 pounds of tar distillate from a cracking coil tar (10° A. P. I.) representing the total overhead boiling up to 660° F. at 1 mm. pressure, was chlorinated until the percentage of combined chlorine reached 9.7%. The chlorinated distillate was then heated up to 660° F. in a still provided with a condenser at atmospheric pressure, whereupon most of the chlorine was removed as hydrochloric acid. Then the distillate was subjected to a vacuum distillation under reduced pressure until a temperature corresponding to 660° F. at 1 mm. pressure was reached. 208 pounds of high softening point residue (S. P. 282° F. ball and ring method) was obtained in this way, which was extracted with light naphtha leaving an insoluble residue amounting to 75 pounds. After removal of the naphtha by distillation 133 pounds of light colored resin was obtained having a softening point of 188° F. (ball and ring method).

Still another process for obtaining resins from very difficultly volatile hydrocarbon oils such as those obtained on distillation of cracking coil tar at reduced pressure, which comprises chlorinating the distillate and agitating it with a condensing agent such as aluminum chloride, hydrolyzing the reaction product, separately removing an oily layer, removing oily constituents therefrom by distillation, and extracting a resin from the residue of this distillation with a selective solvent, is described in the co-pending application Ser. No. 572,060, filed October 30, 1931, by Stewart C. Fulton and John Kunc. This process is illustrated by the following example:

*Example 3*

1000 pounds of distillate from a cracking coil tar of petroleum origin, boiling between 300° F. and 660° F. under an absolute pressure of 1 mm. mercury, was chlorinated at 80° F., using a cooling system to prevent increase in temperature until the chlorine content became 9.7% by weight. The chlorinated distillate was pumped into a tank equipped with an agitator and sealed by a reflux condenser. 50 pounds of anhydrous aluminum chloride was then added and the mixture agitated for 12 hours at 80°–90° F. After the reaction was complete the reaction mixture was washed with water and the oil and sludge charged to a still. The temperature was brought up to 600° F. at atmospheric pressure, then cooled and vacuum applied. The distillation was continued until the temperature of the bottoms became the equivalent of 660° F. under 1 mm. of mercury. In this way 293 pounds of high boiling condensed product was obtained. The bottoms was extracted with 300 gallons of 86° A. P. I. naphtha, obtaining 221 pounds of resin in solution. After removing the solvent by atmospheric distillation there was obtained 221 pounds of resin having a softening point of 213° F.

A process for the preparation of resins by the hydrogenation of asphaltenes remaining after the removal of resins from cracking coil tars with selective solvents is described in co-pending application Ser. No. 572,228, filed October 30, 1931, by Fulton and Kalichevsky.

These synthetic resins derived from petroleum are generally soluble in hydrocarbon oils such as light naphthas, gasolines, lubricating oils, etc., linseed oil, China wood oil and esters such as amyl acetate and benzol. They are insoluble in water, the lower water soluble alcohols and acetone. They are at least partially compatible with nitrocellulose. Solutions of these resins in suitable solvents such as those described above may be used in staining wood and in the preparation of coating compositions generally, such as lacquers, paints, varnishes, and the like. Especially suitable solvents for the preparation of coating compositions containing these resins are the "hydroformed solvents" described in co-pending application Ser. No. 583,703 filed Dec. 29, 1931, by Robert T. Haslam. These hydroformed solvents are produced by the destructive hydrogenation of hydrocarbon oil distillates at elevated temperatures and pressures and have Kauri butanol values generally above 40 or 50. These synthetic petroleum resins are useful both as dyes and as resins in the preparation of surface coating compositions. For example, they may be used in admixture with hydroformed solvents and nitrocellulose or other cellulose plastics for the preparation of lacquers.

Such solutions may also be used for impregnating wood in admixture with suitable impregnants such as those ordinarily used for treating wood with high melting waxes, such as Montan wax, petroleum waxes and the like. The wax impregnation of wood is ordinarily conducted at elevated pressures and at temperatures insufficient to cause charring of the wood, but sufficiently elevated to render the impregnant freely mobile. Petroleum waxes melting above 150° F. and obtained from waxy crudes such as Talang Akar and Pendoepo and heavy waxy distillates containing such waxes are especially suitable for use in conjunction with these resins for the impregnation of wood. These waxes, or the heavy waxy distillates containing them, may be readily decolorized by suitable petroleum refining methods such as treating with sulfuric acid, aluminum chloride, clay or bone char and the like and form a suitable medium in which the color of the resin may be used to good advantage. The use of these petroleum waxes and waxy distillates in wood impregnation is described in the co-pending application Serial No. 588,228 filed Jan. 22, 1932, by Frolich and Baldeschwieler.

The following example illustrates one method of using these synthetic petroleum resins for the impregnation of wood:

*Example 4*

A slop cut having a melting point of 150° F. is obtained as an intermediate fraction between the paraffin distillate and residue on the vacuum distillation of reduced Talang Akar crude. This slop cut is rendered substantially colorless by clay filtration, sulfuric acid treating, or other refining methods. 10 parts of this synthetic petroleum resin, prepared according to any of the above examples, are brought into solution with 90 parts of this decolorized slop cut. Wood, previously dried and subjected to air at elevated pressures, such as 100 to 200 pounds per square inch, is immersed without reduction in pressure in a bath containing this mixture at an elevated temperature insufficient to char the wood for about 4 to 6 hours. When absorption of the mixture is complete the bath is allowed to cool slowly to about 150° F. and the pressure is then released to atmospheric. The expanding air in the wood forces out excess treating material. After cooling, the wax and oil adhering to the surface are scraped from the wood. There is obtained by this process a wax-and-oil impregnated wood which will not sweat or become tacky on exposure to sunlight. Other impregnating methods are also suitable as will be understood by anyone familiar with the wood impregnation art.

The slop cut used in the above example may be prechlorinated by contact with free chlorine as described in the co-pending application Ser. No. 586,460 filed Jan. 13, 1932 by Baldeschwieler and Mudge and by the use of this impregnant a wood is obtained which will not spot or bleach when contacted with water. The wood may also be pretreated according to various known methods to prevent spotting.

Cork, fiber board, wall board, asbestos board and compounded materials of a fibrous and porous nature generally, as well as wood, may be impregnated with these synthetic petroleum resins by any of the methods shown above. This treatment is of especial advantage in waterproofing and weatherproofing such materials. Various modifications of these impregnating methods will be readily ascertainable, and are considered as within the scope of this invention.

This invention is not to be limited to any examples which are given herein solely for purpose of illustration but only by the following claims in which I wish to claim all novelty insofar as the prior art permits.

I claim:

1. Composition of matter comprising a wood impregnated with a stable petroleum resin, consisting substantially of hydrocarbons, in such concentration as to produce a mahogany to oak color, said resin being substantially free of asphaltenes and obtained from a viscous residual tar resulting on cracking a resin-free petroleum oil, said resin being an unsaponifiable solid, clear, light yellow to reddish brown in color, softening point above 80° F., soluble in petroleum naphtha, linseed oil and benzol and insoluble in water, lower alcohols and acetone and being obtained from said cracked petroleum tar by means selected from the group consisting of extraction from said tar with a selective solvent, chlorination and subsequent dechlorination and condensation of distillate from said tar boiling between about 300 and 660° F. at one millimeter absolute pressure of mercury, and by hydrogenation of the asphaltenes of said tar.

2. Composition of matter according to claim 1 and containing in addition thereto a normally solid wax in admixture with said resin.

3. Process for the treatment of wood comprising impregnating the wood with a stable petroleum resin, consisting substantially of hydrocarbon, in such concentration as to produce a mahogany to oak color, said resin being substantially free of asphaltenes and obtained from a viscous residual tar resulting on cracking a resin-free petroleum oil, said resin being an unsaponifiable solid, clear, light yellow to reddish brown in color, softening point above 80° F.; soluble in petroleum naphtha, linseed oil and benzol and insoluble in water, lower alcohols and acetone and being obtained from said cracked petroleum tar by means selected from the group consisting of extraction from said tar with a selective solvent, chlorination and subsequent dechlorination and condensation of distillate from said tar boiling between about 300 and 660° F. at one millimeter absolute pressure of mercury, and by hydrogenation of the asphaltenes of said tar.

4. Process according to claim 3 in which said wood is impregnated with a solution of said resin in a light colored hydrocarbon solvent.

5. Process according to claim 3 in which said wood is impregnated with a solution of said resin and a wax melting above about 150° F. in a light colored hydrocarbon solvent.

PER K. FROLICH.